United States Patent [19]

Hamelink

[11] 4,112,318
[45] Sep. 5, 1978

[54] CONDITION CONTROL SYSTEM UTILIZING DIGITAL LOGIC

[75] Inventor: William B. Hamelink, Richfield, Minn.

[73] Assignee: Honeywell Inc., Minneapolis, Minn.

[21] Appl. No.: 769,752

[22] Filed: Feb. 17, 1977

[51] Int. Cl.² .................. H03K 3/26; G01N 27/00; G08B 21/00
[52] U.S. Cl. .................. 307/308; 307/215; 307/247 R; 328/1; 340/620
[58] Field of Search .................. 307/215, 308, 247 R, 307/252 UA; 328/1; 361/170, 178; 340/244 R, 239 R; 137/382

[56] References Cited

U.S. PATENT DOCUMENTS

| | | | |
|---|---|---|---|
| 3,460,121 | 8/1969 | Wattenburg | 307/247 |
| 3,504,205 | 3/1970 | Sheckler | 307/308 |
| 3,699,560 | 10/1972 | Meanier et al. | 340/239 R |

Primary Examiner—Stanley D. Miller, Jr.
Assistant Examiner—B. P. Davis
Attorney, Agent, or Firm—Alfred N. Feldman

[57] ABSTRACT

A condition control system which utilizes digital logic to respond to the state of the condition being sensed. The control system utilizes a condition responsive element that is energized from an alternating current source and controls a first alternating current type of amplifier. The output of the amplifier is compared with a periodically generated pulse or logic command in an S-R latch circuit which is made up of a pair of NAND gates in a cross-connected configuration. The digital logic is arranged so that an output transistor and relay are energized only when the system senses the presence of the desired condition thereby indicating that it is safe to energize associated equipment.

15 Claims, 5 Drawing Figures

FIG. 2
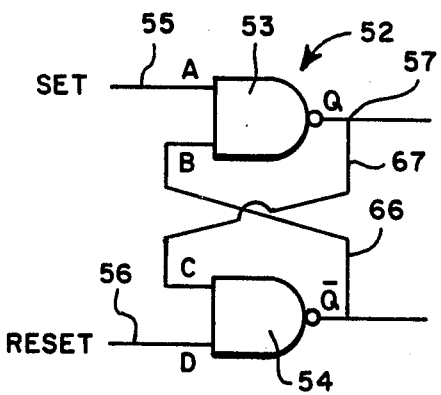
TRUTH TABLE
| S | R | B | C | Q | Q̄ |
|---|---|---|---|---|---|
| 0 | 0 | 1 | 1 | 1 | 1 |
| 0 | 1 | 0 | 1 | 1 | 0 | ←
| 1 | 0 | 1 | 0 | 0 | 1 | ←
| 1 | 1 | 0 | 1 | 1 | 0 | ←
| 1 | 1 | 1 | 0 | 0 | 1 | ←
MEMORY OR HOLD STATES
FIG. 3  WITH ALTERNATING CURRENT VOLTAGE APPLIED TO CONDITION CONTROL SYSTEM
SET 55: WITH CONDITION PRESENT & −VOLTAGE, S = 1
　　　　WITH CONDITION PRESENT, S = 0
　　　　WITHOUT CONDITION PRESENT, S = 1
RESET 56: WITH POSITIVE VOLTAGE, R = 0
　　　　　WITH NEGATIVE VOLTAGE, R = 1
TRUTH TABLE (SUMMARY)
| S | R | Q | |
|---|---|---|---|
| 0 | 0 | 1 | RELAY ENERGIZED |
| 1 | 0 | 0 | |
| 1 | 1 | 1 | HOLD |
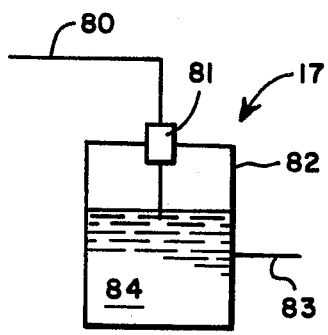
FIG. 5

CONDITION CONTROL SYSTEM UTILIZING DIGITAL LOGIC

BACKGROUND OF THE INVENTION

In typical condition control systems, a sensed condition is normally applied to the input of an analogue type of amplifying system and the output of the amplifier system is used for control purposes. The majority of condition control systems utilize direct current type amplifiers, bridges, and condition responsive elements which change the balance of the bridge and effect an output change from the amplifier system. This type of condition control system has wide utility where the change of condition is relatively small or continuous in nature and/or the output from the condition control system operates a device that is not critical in its operation. The conventional condition control system also requires substantial amounts of equipment to rectify the ordinarily supplied alternating current voltage, and regulate that voltage so as to provide a reliable and accurate system.

SUMMARY OF THE INVENTION

The present invention is directed to a condition control system that utilizes an alternating current source and which applies the alternating current source to the sensing element. The system further utilizes the alternating current source for the generation of a series of logic pulses, both from the sensing circuit and from an auxiliary or logic generating means. The digital logic that is generated by the sensing amplifier and the logic generating means is compared in a latch circuit means. The logic sequence insures that an output is derived from the condition control system only when the condition responsive element and the system are in a state for normal operation of the output switch. In the system specifically considered in the present disclosure, the output switch or relay is used to energize a fuel burner that heats a boiler. Any time that the boiler is low or out of water, the energization of the burner control system, which would light the burner associated with the boiler constitutes an unsafe condition. The present condition control system utilizes a water sensing probe as the condition responsive means. With the present arrangement a water boiler probe and digital logic system is provided which is unique. Normal operation can occur only when water is present in the boiler, and at no other times.

The present system can be made particularly safe when the condition responsive means is a fail safe type of water level probe which utilizes a ground, a probe element and a guard ring which are arranged in a delta configuration of possible resistance paths. This type of sensor is fully disclosed in a copending application filed in the United States on Oct. 2, 1975 in the name of W. B. Hamelink, and now issued as Pat. No. 4,027,172. While any type of condition sensing element can be used with the present invention, the incorporation of the aforementioned fail safe liquid level probe creates a boiler water level control system to operate a fuel burner, which is believed to be significantly more reliable and safer than any other type of commercially available boiler water probe and system.

BRIEF DESCRIPTION OF THE DRAWINGS

FIG. 2 is a description of an S-R latch means and its truth table;

FIG. 3 is a summary of the S-R latch means function;

FIG. 5 is a schematic representation of a boiler water probe used as the condition responsive means for the systems of FIGS. 1 and 4.

DESCRIPTION OF THE PREFERRED EMBODIMENTS

Figure 1:
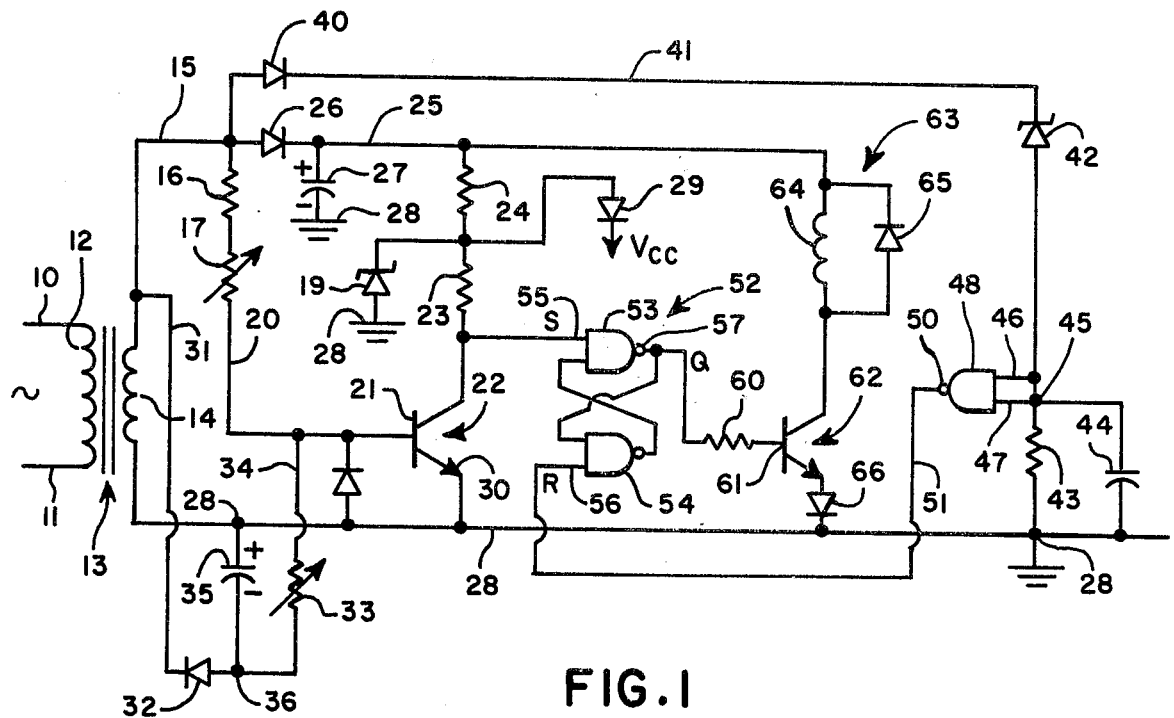
FIG. 1 is a schematic diagram of a preferred embodiment of the present condition control system utilizing digital logic and a logic generating means driven by the applied alternating current source.

The condition control system as disclosed in FIG. 1 is energized on conductors 10 and 11 which are connected to the primary winding 12 of a transformer generally disclosed at 13. The conductors 10 and 11 are connected to any convenient source of alternating current voltage. The transformer 13 normally would be a step-down type of transformer if the input on conductors 10 and 11 is either at a nominal control voltage of 24 volts, or is connected to a conventional 115 volt line source. The transformer 13 would have a secondary winding 14 which normally, in the embodiment disclosed, would have a voltage of approximately 10 volts of alternating current to energize the balance of the system.

The secondary winding 14 is connected by conductor 15 to a resistor 16 and to a condition responsive means 17 which has been disclosed as a variable resistance. The condition responsive means 17 can be responsive to many different types of conditions and has merely been shown for convenience as a variable resistance. In more specific applications of the present device, the condition responsive means 17 could be a water sensing probe as disclosed in FIG. 5, or could be a liquid level probe of the type previously mentioned in connection with the earlier filed Hamelink application. Details of the parameters of the condition responsive means 17 will be discussed in connection with the operation of the entire circuit.

The condition responsive means 17 is connected by a conductor 20 to the base 21 of a transistor, generally disclosed at 22. The transistor 22 is supplied with a voltage through a pair of resistors 23 and 24 which are connected to the conductor 25 through a diode 26 that rectifies an alternating current supplied. A capacitor 27 to a circuit ground 28 provides a direct current potential for parts of the system. The transistor 22 further has an emitter connection 30 that is also connected to the circuit ground 28 which is connected back to the secondary winding 14. It is thus apparent that when an alternating current appears across the secondary winding 14, that current flows through the diode 26 to charge the capacitor 27 and that the voltage appearing across the capacitor 27 is applied through the resistors 23 and 24 to the emitter-collector circuit of the transistor 22. Also, a zener diode 19 and a further diode 29 provides a regulated direct current potential for the digital circuits to be described.

A conductor 31 is also connected to the transformer secondary 14 as is the conductor 15. The conductor 31 is connected further through a diode 32 and a variable resistance 33 to a conductor 34 that is connected to conductor 20. The variable resistance 33 is used as a sensitivity adjustment for the system. A capacitor 35 is connected between a point 36 that is common to the variable resistance means 33 and the diode 32, and the circuit ground 28. The capacitor 35 takes on a voltage charge as indicated by the polarity markings. The charge circuit for the capacitor 35 is through the diode 32 and through the conductor 31 to the secondary winding 14 and back to the common ground 28. It is apparent that whenever the secondary winding 14 has a polarity with the conductor 31 negative with respect to the circuit ground 28, a current flows to charge the capacitor 35. When the polarity reverses, that is, when the conductor 31 is positive with respect to the circuit ground 28, a positive polarity is supplied on conductor 15 through the diode 26 to charge the capacitor 27. It will be noted that the capacitor 35 is connected through the variable resistance means 33, the conductor 34, and the conductor 20 to the base 21 of the transistor 22, thereby providing a reverse bias to keep the transistor 22 cut off whenever the base 21 does not receive a voltage sufficient to overcome the negative bias supplied by the capacitor 35. The level of voltage applied through resistance means 33 sets the sensitivity of the system. This is a function which will become important in connection with the description of the operation of the system.

Connected to conductor 15 is a further diode 40 that is connected by a conductor 41 and a zener diode 42 to a resistor 43 to the circuit ground 28. It will become apparent that whenever the conductor 15 swings positive with respect to the circuit ground 28, that a current flows in the conductor 41 and is delayed by the zener diode 42 to provide a voltage across the resistor 43 and the capacitor 44. Connected to the common junction 45 of the resistor 43 and the capacitor 45 are a pair of input gates 46 and 47 for a NAND gate generally disclosed at 48. This forms an inverting amplifier and is shown in this form for convenience. The NAND gate 48 has an output means at 50 that is connected to a conductor 51. Since the inputs 46 and 47 of the NAND gate 48 are connected together, the NAND gate 48 will have no output at 50 whenever there is a voltage applied to the junction 45 of the two gates 46 and 47. Conversely, whenever the junction 45 is devoid of a voltage, the NAND gate 48 will have a voltage output at 50. The presence of a voltage will be referred to as a "1" and the absence of any output voltage will be referred to as a "0." This is conventional digital logic, and is well understood in the digital logic art. In the balance of the description the presence of a digital voltage will be referred to as a "1", and the absence of a digital voltage will be indicated as a "0." It should be understood that negative logic could also be used with the present system, and will be within the scope of the claims appended to the present application.

The present condition control system further includes a latch means that has been generally disclosed at 52. The latch means 52 includes a pair of NAND gates 53 and 54 and in reality is a flip-flop circuit including a pair of cross-connected NAND gates 53 and 54. This type of latch means will be referred to as an S-R latch means 52 and will be described in some detail in connection with FIG. 2 where the S-R latch means is completely disclosed along with a complete truth table. For the time being it is sufficient to indicate that the S-R latch means 52 has a set input 55 which is connected to the junction of the resistor 23 and the transistor 22. The conductor 55 forms an input means for the S-R latch means 52. The S-R latch means 52 has a further logic input means 56 which is normally referred to as the reset for the latch means 52. The further logic input means 56 is connected to conductor 51 so that the logic input means 56 acts as a reset for the device. The logic input means 56 will be generally referred to as the reset for the S-R latch means 52 while the input means 55 will generally be referred to as the set input for the S-R latch means. The S-R latch means has a further active terminal in the present circuit at 57 and is the output means for the S-R latch means. The output means 57 is connected through a resistor 60 to the base 61 of a transistor 62 which forms part of a larger switching output means 63. The switching output means 63 includes a conventional relay 64 that is paralleled by a free wheeling diode 65. The transistor 62 has a diode 66 for a voltage bias of transistor 62 and the diode 66 is connected to the circuit ground 28. The conductor 25 supplies power to the switching output means 63 by connecting to the relay 64 which in turn supplies the power to the transistor 62. The switching output means 63 is controlled so as to switch a load, not shown, that is operated in response to the condition responsive means 17.

Before a description of operation of the circuit of FIG. 1 is provided, a description of the S-R latch means 52 and its truth table will be disclosed in connection with FIG. 2. A simplified form of the truth table and some of the conditions which exist in the disclosed circuit of FIG. 1 will be brought out in connection with FIG. 3. After FIGS. 2 and 3 are considered, the operation of the condition control system of FIG. 1 can be readily understood.

In FIG. 2 the S-R latch means 52 is disclosed as made up of the NAND gate 53 and the NAND gate 54 cross-connected to form a flip-flop type circuit. The set input 55 is disclosed along with the reset 56 and the active output means 57. A second gate input B is cross-connected by a conductor 66 to the output Q. The NAND gate 54 has a further gate input C that is cross-connected by conductor 67 to the conductor or output means 57 or Q of the S-R latch means.

Adjacent to the detailed disclosure of the S-R latch means 52 is a conventional truth table showing the digital logic at the set, reset, B, C, Q and Q points. This truth table is the conventional truth table for the S-R latch means disclosed and will not be expanded in great detail. The truth table for the S-R flip-flop indicates that five possible states can exist. The first three states are states which can be readily defined while the fourth and fifth states are indeterminate. The indeterminate states can be considered a memory or hold state for the device and in each case, as is shown by brackets, the device will return to the state that it was in at the time either of the indeterminate states occurs. The truth table and disclosure of FIG. 2 are for convenience in considering the special case that is used in the device disclosed in FIG. 1.

In FIG. 3 the special case that applies to FIG. 1 has been disclosed in a simplified form. In FIG. 3 the system of FIG. 1 is referred to as operating with an alternating current voltage applied to the condition control system. The S-R latch means 52 has been selected so that the reset gate 56 will have a 0 whenever the applied voltage is positive. With a negative voltage applied to the system, that is the reverse of the voltage so that conductor 15 of FIG. 1 is negative with respect to the ground 28, the reset gate 56 will receive a 1. At this same time the set gate 55, with the sensed condition present, will have a 0 on the set gate 55. If the condition being sensed is absent, the set gate 55 will have a 1 present. Since the transistor 22 of FIG. 1 is arranged with a negative bias from the capacitor 35, the transistor 22 can never conduct when the voltage being applied to the system is negative on conductor 15 with respect to the ground 28. As a result, the condition of the truth table in which the set equals 0 and the reset equals 1 is of no consequence. Considering this, the truth table can be simplified to three possible states. The first state is with the set and reset both at 0 and the Q output at 1, with the set at 1 and the reset at 0 which yields an output at Q of 0, and with a set at 1 and a reset at 1 which establishes a memory or hold state and the logic reverts back to its previous conditon or state.

OPERATION OF FIG. 1

The simplest way to explain the operation of FIG. 1 is to consider the condition responsive means 17 as a boiler water probe. In that case, the condition responsive means 17 will either be a very high resistance when no water is present, or a very low resistance when boiler water is present. When no water is present, the system is considered unsafe, while the system is considered safe when water is present and the condition responsive means or resistance 17 is a low resistance value. Further, the relay 64 should be energized only when the condition responsive means 17 indicates that water is present since the relay 14 is connected to a fuel burner control system to energize a fuel burner. In the following discussion, a relatively low value of resistance for the element 17 and the energization of the relay 64 will be considered the safe and normal state for the system.

If energy is supplied to the system and water is present, the condition responsive means or probe 17 will provide a very low resistance from conductor 15 to the transistor base 21. At this same time, the capacitor 35 has charged to some value applying a negative bias of a direct current nature to the base 21. The application of the positive swing of the output voltage of the secondary winding 14 will drive a current through the resistor 16, the water or sensor means 17 into the base 21 turning "on" the transistor 22. Turning "on" transistor 22 pulls the set gate 55 down to the circuit ground 28 thereby providing, in effect, a 0 in digital logic. At this same time, a positive potential is applied through the diode 40, conductor 41 and zener diode 42 to the parallel connected NAND gates 46 and 47. With the gates 46 and 47 receiving a potential, there will be no potential at the output means 50 and the conductor 51 will be at a 0 potential. This 0 potential is connected to the reset gate 56 of the S-R latch means 52. In consulting the truth table of FIG. 3 it is apparent that with the set and reset both at 0, the output at 57 is a 1. The 1 provides a driving potential through the resistor 60 to the base 61 of the transistor 62 thereby turning "on" transistor 62 and pulling in the relay 64. With the relay 64 energized, the associated burner equipment, not shown, is capable of being energized to supply heat to the boiler.

On the next half cycle of the applied alternating current voltage, the conductor 15 is driven negative with respect to the circuit ground 28. The transistor 22 is biased "off" by the voltage on capacitor 35 thereby providing the set gate 55 with a high voltage or a 1. At this same time no voltage is being driven through the diode 40, conductor 41, and the zener diode 42 so that the gates 46 and 47 of the NAND gate 48 receives no potential. The NAND gate with no potential on its gates 46 and 47 has a 1 output at the output means 50. This applies a 1 to the reset 56. The truth table of FIG. 3 shows that if a 1 exists at both the set and the reset gates 55 and 56, that the device holds in the condition that it was in previously. It is thus seen that with water present or the condition responsive means 17 being a very low value, the system pulls in the relay 64 of the switching means 63 and provides for safe operation. If the condition exists where the condition sensing means or water probe 17 does not sense water, the resistance at 17 is a very high value approaching an open circuit. Under these conditions when the voltage on conductor 15 is driven positive with respect to the ground 28, the negative bias arrangement from the capacitor 5 holds the transistor 22 out of conduction. As a result, the set gate 55 has a high voltage or a 1 present. At this same time voltage is driven through the diode 40, the conductor 41 and the zener diode 42 to drive both of the bates 46 and 47 thereby providing a 0 at the output of the NAND gate 58. The 0 is connected to the reset 56 of the S-R flip-flop means 52. As will be noted from the truth table in FIG. 3, when the set gate 55 has a 1 and the reset gate 56 has a 0, the output Q is 0 at 57. With no output at 57, the transistor 62 is not driven into conduction and the relay 64 is deenergized.

On the reverse half cycle of the alternating current, the transistor 22 will again be biased out of conduction and a 1 will appear at the set gate 55. At this same time neither the NAND gates 46 and 47 are driven and therefor the output means 50 of the NAND gate 48 provides a 1. As will be noted from the truth table, the situation of 1's existing at the set and reset gate again is a hold condition, and the relay 64 of the output or switching output means 63 is kept "off."

From the aforegoing it can be seen that whenever the condition responsive means 17 senses the presence of the desired condition, the digital logic provides for the energization of the switching output means 63 in a safe manner. In the absence of the condition to be sensed, the digital logic provides for the deenergization of the switching output means 63 and relay 64. In the event that the logic changes because of the alternating current nature of the applied voltage, the digital logic holds in the previous state. These conditions all evolve into a safe operating system.

As will be noted in FIG. 1 the logic generating means in the form of the NAND gate 48 cycled periodically and in synchronism with the alternating current source applied to the system. This provides a very simple and very fast acting system where that type of response is needed. In some systems, a delay may be desirable in the operation of the system in order to overcome problems of transients, minor operating idiosyncrasies of equipment, and the operating times of certain types of equipment.

Figure 4:
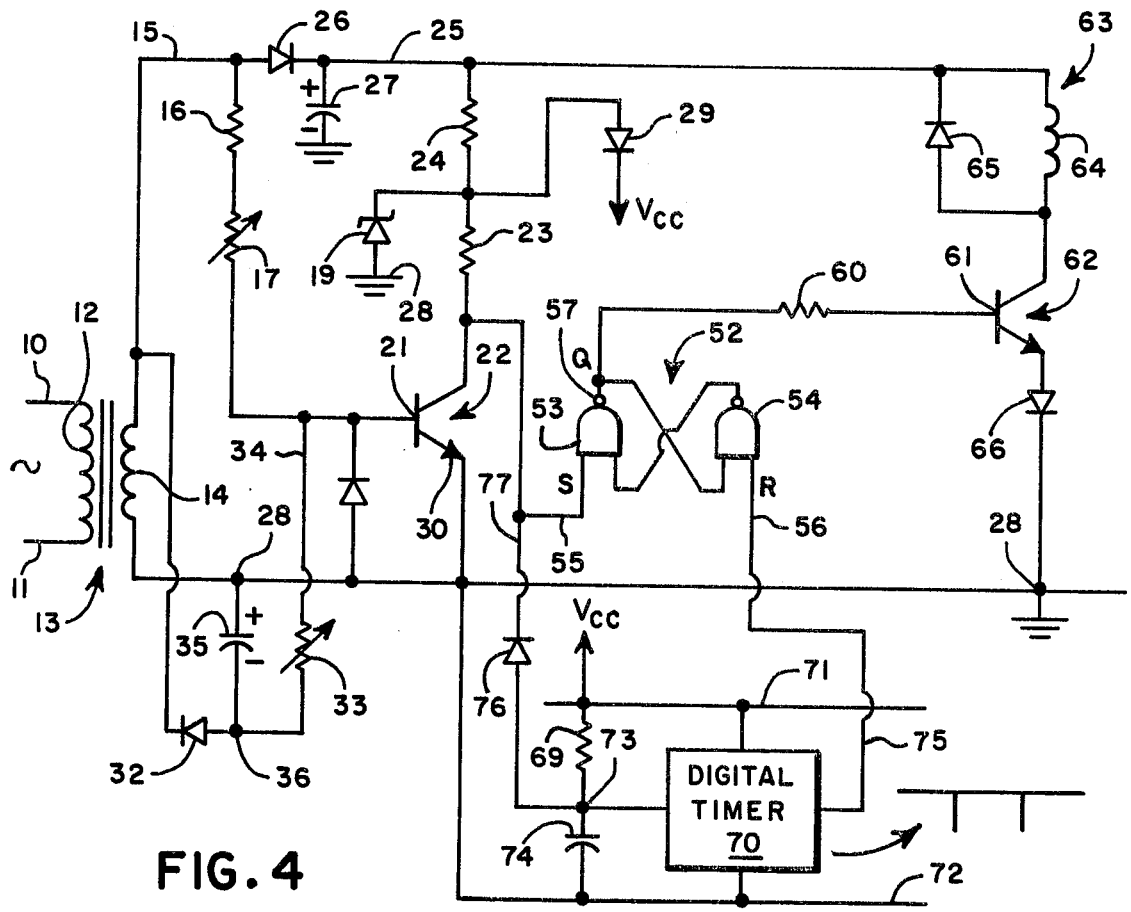
FIG. 4 is a second embodiment of the present condition control system utilizing a digital timer for the logic generating mean.

In FIG. 4 a system is disclosed which provides for a delay in operating the system where a delay is necessary. The bulk of the system is identical to the system disclosed in FIG. 1 with the exception of the design of the logic generating means that is connected to the reset of the S-R latch means 52. Similar numbers will be used for all similar items throughout the circuit, and only the additional portion of the circuit where the modification takes place will be described at this point.

Replacing the NAND gate 48 is a digital timer means 70. The digital timer means 70 can be made up of conventional digital components that are commercially available, such as a signetics NE 555V. The digital timer means 70 is supplied with voltage on conductors 71 and 72, which is the circuit ground. The voltage on conductor 71 is derived from the previously disclosed diodes 19 and 29 which are connected to the resistor 24 and the conductor 25 which in turn is connected to the direct current storage capacitor 27. The voltage from the diode 29 again is used to drive the S-R latch means 52 as was the case in connection with FIG. 1.

The digital timer means 70 is a free running timer with a timing resistor 69 and capacitor 74 connected by a clamping diode 76 at 73, and by conductor 77 to the transistor 22. Transistor 22 operates to provide a set pulse on the set input 55, and to discharge capacitor 74 to ground 28 when transistor 22 conducts. The digital timer means 70 provides a reset pulse on conductor 75 if capacitor 74 is allowed to charge. The digital timer means 70 can be designed and arranged to provide an output 0 and 1 sequence of any time interval that is appropriate. In a boiler water level sensing system, a 5 second delay by the use of the digital timer means 70 can be conveniently used to prevent the switching output means 63 from inadvertently dropping out its associated burner control equipment if the water level momentarily drops below the end of the water sensing probe. Any other type of transient on the system also is delayed so that the burner control equipment does not unnecessarily cycle. As can be seen, the circuit of FIG. 4 operates substantially the same as that of FIG. 1, but with a delay in the application of the further logic input means or reset pulse on the reset gate 56.

In both circuits disclosed in FIGS. 1 and 4, the condition responsive means 17 has been disclosed as a variable resistance that has been equated to a boiler water or liquid level type probe. If the fail safe type probe previously disclosed in the earlier filed Hamelink application is used, the condition responsive means 17 would replace the probe element and its ground connections as the two ends of the condition responsive means 17. The circuit ground 28 would be connected to a guard ring of the probe device. This provides the three point connection that is necessary for the fail safe type of liquid level probe of the previously mentioned Hamelink application. The installaton of that type of liquid level probe in the present system substantially provides for a fail safe type of liquid level sensing system along with the advantages of the present digital condition control system. All of the system can be readily energized from a convenient alternating current source of potential without the need of the more complex and expensive direct current types of amplifiers and electronics.

In FIG. 5 a very simple disclosure of a boiler water probe has been disclosed in order to complete the present disclosure. The probe of FIG. 5 is generally disclosed as the condition responsive means 17 having a conductor 80 mounted through an insulator 81 into a boiler 82 that is grounded at 83 as a system ground as opposed to the circuit ground 28. Water 84 is disclosed as being contained in the boiler 82 and being in contact with the conductor 80 as it projects through the insulator 81. The conductor 80 would be connected to the resistor 16 of FIGS. 1 or 4, and conductor 83 would be connected to the conductor 20 in FIGS. 1 and 4. As long as the water 84 in the boiler 82 is in contact with a conductor 80, a relatively low value of resistance is present at the condition responsive means 17. If the water 84 drops in the boiler 82 below the end of the conductor 80, a relatively high value of resistance is present, and substantially equals infinity. This high value of resistance indicates the absence of water in the boiler 82.

While the present system has been described as being specifically adapted to the sensing of water in a boiler in a flame safeguard type of application, the present condition control system can be utilized in any type of system where the condition responsive means 17 has a relatively wide swing in resistance value so as to be able to accurately control the turn "on" and turn "off" of the transistor 22. As can be seen from the variances of FIGS. 1 and 4, modifications in the present circuit can be readily made to accomplish different types of digital logic. The particular S-R latch means disclosed is one type of latch means that could accomplish the digital logic. As a result of the above, it is apparent that many combinations of arrangements of circuit details would be possible to accomplish the present invention. In view of this, the applicant wishes to be limited in the scope of his invention solely by the appended claims.

The embodiments of the invention in which an exclusive property or right is claimed are defined as follows:

1. A condition control system energized from an alternating current source, including: amplifier means having input means connected to condition responsive means which is energized from said alternating current source, and said amplifier means further including directed current bias means; said amplifier means including output means having a logic response to a selected level of a condition at said condition response means; S-R latch mmeans including input means connected to said amplifier output means and receiving logic input from said amplifier output means; said S-R latch means having further logic input means, and output means; logic generating means connected to said further logic input means to periodically provide said S-R latch means with a logic input; and switching output means having an input connected to said latch output means with said latch means causing said switching output means to provide an output only when both of said S-R latch logic input means respond to the presence of logic indicating said selected level of said condition is present.

2. A condition control system as described in claim 1 wherein said logic generating means is operated in synchronism with said alternating current source thereby supplying said periodically provided logic to said S-R latch means each cycle of said alternating current source.

3. A condition control system as described in claim 2 wherein said switching output means includes solid state switching means operated by said S-R latch output means.

4. A condition control system as described in claim 3 wherein said S-R latch means is a flip-flop circuit including a pair of cross-connected NAND gates.

5. A condition control system as described in claim 4 wherein said logic generating means is a NAND gate with a pair of inputs connected in common and driven by said alternating current source through diode means; and said logic generating means NAND gate output means being connected to said S-R latch input means.

6. A condition control system as described in claim 2 wherein said switching output means includes a solid state switch and a relay operated by said S-R latch output means.

7. A condition control system as described in claim 6 wherein said condition responsive means is a variable resistance element that changes resistance between a low and a high value abruptly between the presence and the absence of said sensed condition.

8. A condition control system as described in claim 7 wherein said amplifier means is a transistor with a base connected to said variable resistance element and said base is energized by said alternating current source when said resistance element is at its low value.

9. A condition control system as described in claim 8 wherein said variable resistance element is a water level sensor and said low value is when said sensor is in contact with water to be sensed, and said high value is when said sensor is not in contact with water to be sensed.

10. A condition control system as described in claim 1 wherein said logic generating means includes timer means wherein said periodically provided logic input to said S-R latch means is independent of the frequency of said alternating current source.

11. A condition control system as described in claim 10 wherein said switching output means includes solid state switch means operated by said S-R latch output means.

12. A condition control system as described in claim 11 wherein said switching output means further includes a relay.

13. A condition control system as described in claim 12 wherein said S-R latch means is a flip-flop circuit including a pair of cross-connected NAND gates.

14. A condition control system as described in claim 13 wherein said condition responsive means is a variable resistance element that changes resistance between a high and a low value abruptly between the presence and the absence of said sensed condition.

15. A condition control system as described in claim 14 wherein said variable resistance element is a water level sensor and said low value is when said sensor is in contact with water to be sensed, and said high value is when said sensor is not in contact with water to be sensed; and said amplifier means is a transistor with a base connected to said water level sensor which is energized by said alternating current source when said water level sensor is in contact with said water.

* * * * *